United States Patent
Davey et al.

(10) Patent No.: US 6,456,722 B1
(45) Date of Patent: Sep. 24, 2002

(54) SPEAKER MOUNTING ASSEMBLY FOR A VEHICLE PANEL

(75) Inventors: Geoffrey William Davey, Huntington Woods; Terry Lynn Brandl, Marine City, both of MI (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 09/573,746

(22) Filed: May 18, 2000

Related U.S. Application Data

(60) Provisional application No. 60/134,627, filed on May 18, 1999.

(51) Int. Cl.[7] .................................. H04R 25/00
(52) U.S. Cl. .................................. 381/389; 381/395
(58) Field of Search ................. 381/86, 87, 386, 381/389, 395; 181/199

(56) References Cited

U.S. PATENT DOCUMENTS

| | | | |
|---|---|---|---|
| 4,993,510 A | | 2/1991 | Kato et al. |
| 5,606,623 A | * | 2/1997 | Bahm, III et al. ............ 381/86 |
| 5,754,664 A | | 5/1998 | Clark et al. |

FOREIGN PATENT DOCUMENTS

| EP | 0 769 420 A2 | 4/1997 |
|---|---|---|

OTHER PUBLICATIONS

International Search Report for International Application No. PCT/CA00/00575.

* cited by examiner

*Primary Examiner*—Sinh Tran
(74) *Attorney, Agent, or Firm*—Clark Hill PLC

(57) ABSTRACT

An audio speaker mounting assembly for mounting an audio speaker to interior substrate panel and sheet metal panel of an automotive vehicle includes a cover member attached to the speaker adjacent the substrate panel. The assembly further includes a retainer bracket positioned between the substrate panel and the sheet metal panel. The substrate panel includes an opening therethrough for receiving the speaker. The substrate panel is sandwiched between the cover member and the retainer bracket. The cover member includes a pair of spaced apart cover connecting structures projecting through opening in the substrate panel for locking engagement with a respective pair of retainer bracket connecting structures projecting from the retainer bracket into the opening in the substrate. An opening extends through each of the connecting structures of the cover member and is axially aligned with a corresponding through-holed in each of the connecting structures of the retainer bracket. A fastener extends through each of the respective axially aligned openings and through-holes and is lockingly secured to the sheet metal panel for retaining and supporting the speaker mounting assembly and speaker in the vehicle.

14 Claims, 3 Drawing Sheets

SPEAKER MOUNTING ASSEMBLY FOR A VEHICLE PANEL

This application claims priority from Provisional application Ser. No. 60/134,627, filed May 18, 1999.

FIELD OF THE INVENTION

The present invention relates to an audio speaker mounting assembly for mounting an audio speaker to an interior panel of a vehicle.

BACKGROUND OF THE INVENTION

In the automotive industry, audio speaker systems are commonly mounted to various interior panels of a vehicle to provide for surrounding audio performance. For example, such audio speakers are often mounted to an overhead vehicular ceiling structure, known as the headliner. Certain interior panels, such as headliners, are comprised of a substrate layer of semi-rigid material, such as expanded plastic foam or the like, disposed interiorly of a sheet metal layer of the vehicle.

Prior art arrangements for installing audio speakers to interior panels, such as headliners, have typically involved providing ancillary structures secured to the semi-rigid foam substrate layer, and mounting the audio speaker to the ancillary structure. A shortcoming of such systems is that the semi-rigid substrate layer is of limited strength, and therefore, the size and weight of a speaker that can be mounted by such an arrangement is inherently limited. Moreover, the integrity of the mounting arrangement can be compromised by the excessive accelerations to which a vehicle can be subjected during a vehicle collision.

SUMMARY OF THE INVENTION

The foregoing disadvantages of prior art speaker mounting assemblies are overcome in accordance with the principles of the present invention by the provision of an audio speaker mounting assembly which can be snugly secured to the foam substrate material to hold the speaker and mounting assembly in place during installation of the substrate material and which is fastened directly to the sheet metal layer of the interior panel of the vehicle during installation so that the speaker weight is actually supported and secured by the sheet metal layer, and not by the foam substrate layer alone.

In particular, the forgoing disadvantages of prior art speaker mounting assemblies are overcome by an assembly for mounting an audio speaker to an interior panel of a vehicle constructed in accordance with the present invention. The interior panel of the vehicle includes a metal backing having an inner surface and a substrate layer having an outer surface facing the inner surface of the metal backing and an inner surface facing the interior of the vehicle. The assembly comprises a retainer bracket, a cover member, and one or more fastener elements.

The retainer bracket is disposed between the substrate layer and the metal backing, and the coder member is disposed against the inner surface of the substrate layer. The cover member includes a locking bezel portion having connecting structures that cooperate with mating connecting structures formed on the retainer bracket to secure the cover member to the retainer bracket with the substrate layer sandwiched therebetween. The cover member carries an audio speaker.

The one or more fastener elements extend through one or more associated fastener openings formed in the cover member, the substrate layer, and the metal backing, to thereby attach the cover member, the retainer bracket, and the audio speaker to the metal backing.

DETAILED DESCRIPTION OF THE PREFERRED EMBODIMENT

Figure 1:
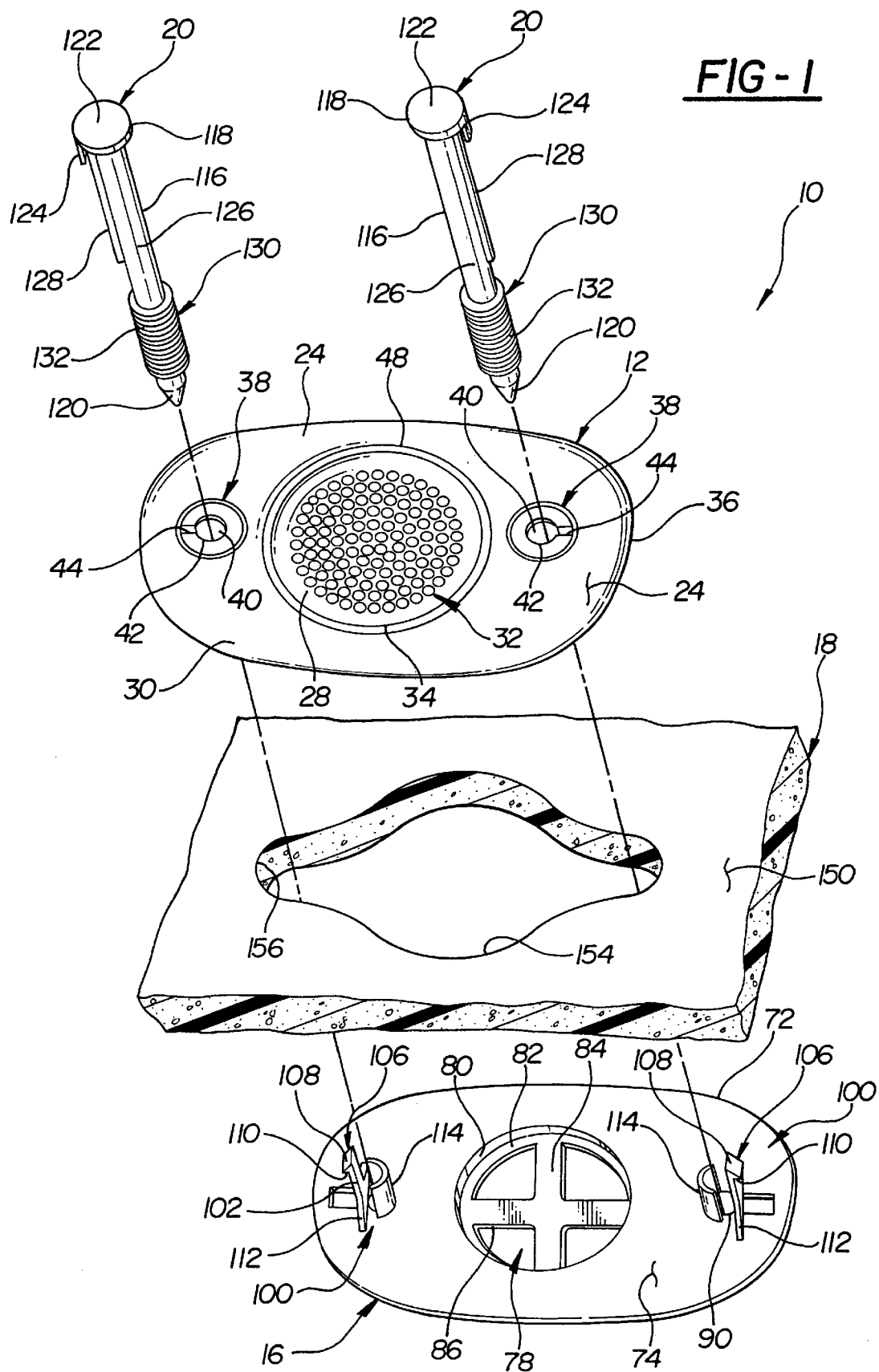
FIG. 1 is an exploded perspective view of a speaker mounting assembly according to the present invention, viewed from the interior of the vehicle.
Figure 2:
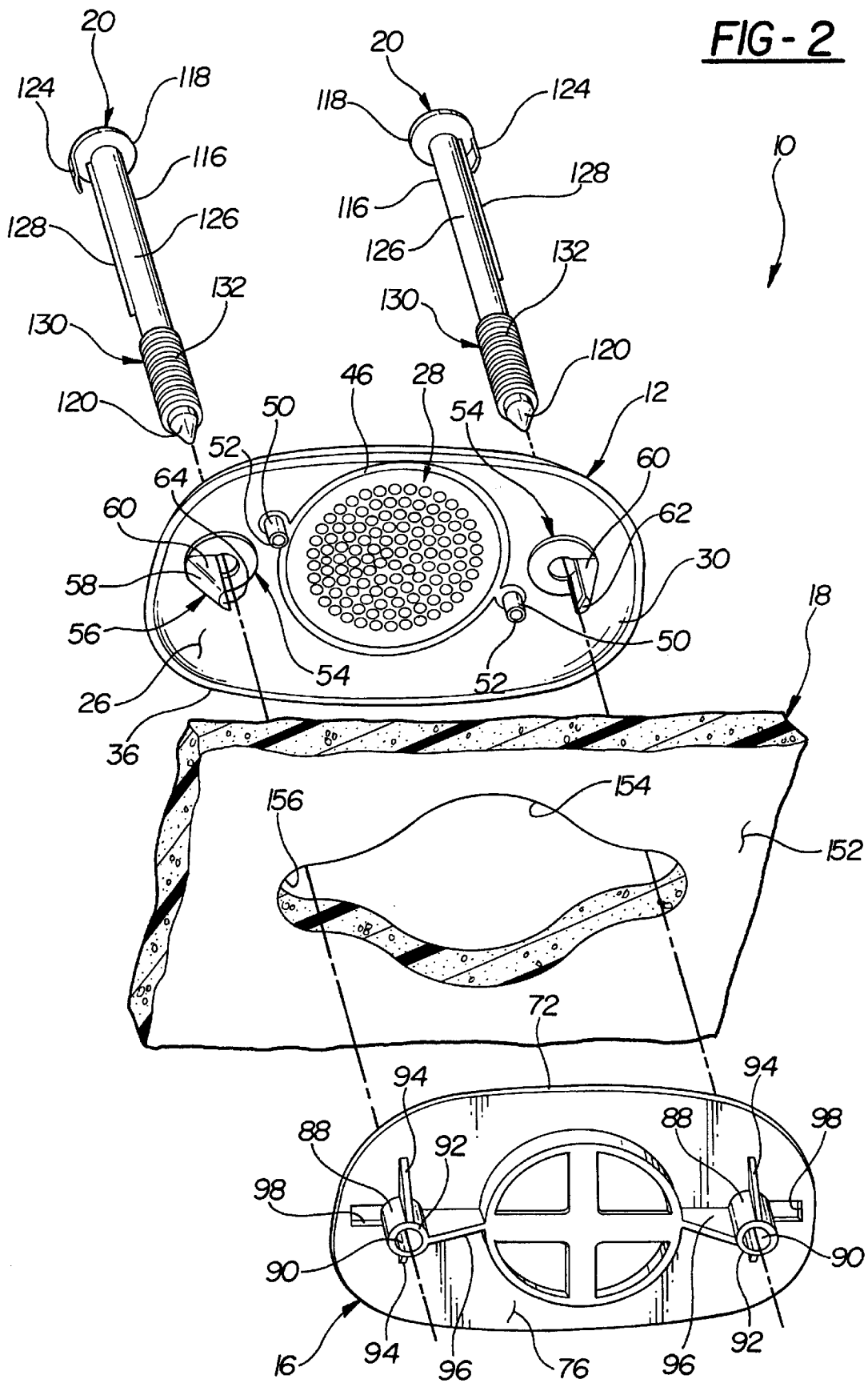
FIG. 2 is an exploded perspective of a speaker mounting assembly according to the present invention, viewed from the exterior of the vehicle.
Figure 3:
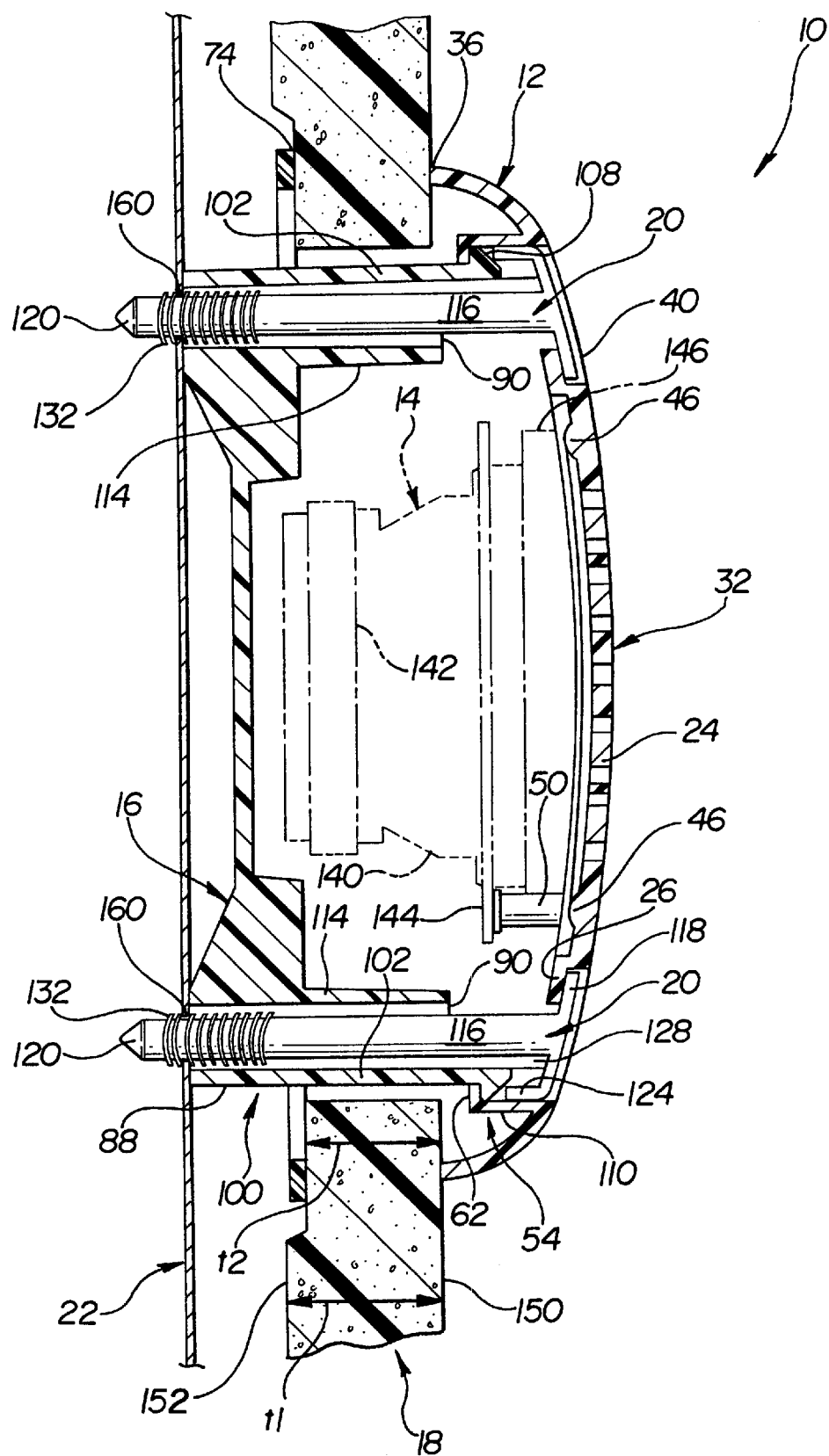
FIG. 3 is a transverse cross-section of the speaker mounting assembly according to the present invention.

Referring the FIGS. 1–3, an audio speaker mounting assembly according to the present invention is generally shown at 10. The audio speaker mounting assembly includes a injection molded cover member 12 is to which a speaker 14 is attached, a retainer bracket 16 to which the cover member 12 and speaker 14 are attached with a portion of a substrate panel 18 sandwiched between the cover member 12 and retainer bracket 16, ad a pair of fasteners 20 securing the mutually attached cover member 12 and retainer bracket 16 to a portion of a sheet metal panel 22. The speaker 14 may be of conventional design and does not form a portion of the invention, except to the extent that it defines the purpose of the invention. Similarly, the sheet metal panel 22 and the substrate panel 18 are conventional and do not form a portion of the invention except to the extent that they define the environment in which the invention is applied and to the extent that they are modified to accommodate the invention.

The cover member 12 has an interior surface 24, as shown in FIG. 1, and an exterior surface 26, as shown in FIG. 2. In the context of the present disclosure, unless stated otherwise, the words "interior" and "exterior" are defined with reference to the interior or exterior of the passenger compartment of the vehicle. That is, an interior surface faces the interior of the passenger compartment, and an exterior surface faces the exterior of the passenger compartment.

Referring now to FIG. 1, the cover member 12 includes a speaker portion 28 and a surrounding locking bezel portion 30, which in the illustrated and preferred embodiment are integrally formed of injection molded ABS polycarbonate. It is to be understood, however, that the speaker portion 28 and locking bezel portion 30 need not be integrally formed and may comprise separate components connected to one another by integrally formed connecting elements and/or by appropriate fastening elements or adhesives.

The speaker portion 28 includes a grill 32 defined by an array of circular openings 34 which permit the majority of acoustic output of the speaker 14 to pass through the grill 32 toward the interior of the passenger compartment. In the illustrated embodiment, the grill 32 and speaker portion 28 are circular and each of the openings 34 is also circular. It is to be understood, however, that the shape and size of the grill and/or speaker portion 28 can be modified as necessary to accommodate speakers of different shapes and sizes or to accommodate aesthetic concerns. Furthermore, the openings 34 formed in the grill 32 may comprise a series of parallel slots, or the grill 32 may comprise an open frame structure covered by a suitable upholstery fabric or the like.

The interior surface 24 of the cover member 12 is preferably convexly shaped, curving down toward a peripheral edge 36 of the cover member 12. Recessed areas 38 are formed in the locking bezel portion 30 on opposite sides of the cover 12. The recessed areas 38 accommodate the heads of the fasteners 20, as will be described below.

A pair of openings 40 are formed in the locking bezel portion 30, one opening 40 being formed in each of the recessed areas 38. The openings 40 include a circular portion 42 and an adjacent rectangular portion 44 projecting transversely from the circular portion 42.

Referring to FIG. 2, the exterior surface 26 of the cover member 12 is shown and includes a sealing rib 46 surrounding and enclosing the speaker portion 28. A groove 48 formed in the interior surface 24, as shown in FIG. 1, and surrounding the speaker portion 28, provides the necessary relief for injection molding of the sealing rib 46 to avoid molding distortions which can be caused if the sealing rib 46 were merely formed by excess material applied to the exterior surface 26. A pair of raised, or outwardly projecting, cylindrical studs 50 are formed at diametrically opposed locations with respect to the speaker portion 28. The studs 50 each include a central blind-hole 52 and provide a fastener receiving structure for securing the speaker 14 to the cover member 12.

The cover member 12 further includes a pair of cover connecting structures 54 formed opposite the recessed areas 38 and on the exterior surface 26 of the locking bezel portion 30 of the cover member 12. Each cover connecting structure 54 includes a riser structure 56 extending from the exterior surface 14. The riser structure 56 includes an outer wall 58 and a pair of opposed angled side walls 60, each extending transversely from the outer wall 58. The outer wall 58 and side walls 60 are all formed along respective edges of the rectangular portion 44 of the opening 40 and together surround the rectangular portion 44 on three sides thereof. The riser structure 56 terminates in a shelf 62 extending transversely with respect to the outer wall 58 and side walls 60. The shelf 62 includes a beveled edge 64.

Referring to FIGS. 1 and 2, the retainer bracket 16 includes a main portion 72, which may be planar as shown in the Figures or may be contoured so as to conform to the intended shape of the substrate panel 18 to which the speaker mounting assembly 10 will be attached. The retainer bracket 16 is preferably formed of injection molded polypropylene. The main portion 72 defines an interior surface 74, as shown in FIG. 1, and an exterior surface 76, as shown in FIG. 2.

Referring specifically to FIG. 1, the interior surface 74 of the retainer bracket 16 is shown including a recessed area 78 formed generally in the center of the main portion 72 and is defined by an annular transverse wall 80, surrounding the recessed area 78, and an annular rim flange 82 extended transversely from an end of the annular wall 80. A reinforcing structure 84 extends across and between the opposite facing sides of the annular rim flange 82 and in the preferred embodiment comprises a cross structure defined by two right angle arms extended diametrically across he diameter of the recessed area 78 and defining four open quadrants 86. Although the reinforcing structure 84 could comprise a solid panel defining a closed end surface of the recessed area 78, the open cross structure illustrated is preferred, as the open quadrants 86 permit speaker wires to be passed through the retainer bracket 16, reduce the weight of the retainer bracket 16, and enhance the acoustic performance of the audio system by permitting a portion of the acoustic output of the speaker 14 to travel rearwardly of the speaker 14.

It should be appreciated that while the recessed area 78 is circular in the illustrated embodiment, it may be rectangular or oval in shape, as determined by manufacturing and installation requirements (i.e., the shape of the speaker).

Referring again to FIG. 2, the exterior surface 76 of the retainer bracket 16 is shown including a pair of outwardly projecting, raised tubular studs 88 formed at diametrically opposed positions with respect to the recessed area 78. Each stud 88 has a central through-hole 90 formed therein defining an annular rim 92 at the distal end of the stud 88. A pair of opposing lateral gussets 94 and a longitudinal gusset 96 may be integrally formed with each stud 88 so as to enhance the strength and durability of the stud 88. Rectangular openings 98 are also formed at outer sides of the raised studs 88 during the forming of the retainer bracket 16.

Referring back to FIG. 1, the retainer bracket 16 further includes a pair of spaced apart retainer bracket connecting structures 100 formed on opposite sides of the retainer bracket 16 adjacent the outer edges of the central through-holes 90 formed by the raised studs 88. Each retainer bracket connecting structure 100 comprises an outwardly projecting riser 102 terminating in a head 106 having a beveled outer surface 108 and a transverse lip 110. A pair of lateral support gussets 112 may be formed on opposite sides of the riser 102 to further enhance the strength and durability of the riser 102. Each of the retainer bracket connecting structures 100 further include an inner arcuate riser 114 formed along and projecting outwardly from an inner edge of each of the through-holes 90, opposite the respective riser 102.

Referring to FIGS. 1 and 2, a pair of fasteners 20 are shown, each including an elongated cylindrical shank 116 extending from an enlarged head 118 to a distal pointed tip 120. The head 118 has a top surface 122 and a registration tab 124 extending laterally from a peripheral edge of the head 118. The shank 116 includes a smooth portion 126 extending from the head 118 toward the tip 120 and having a longitudinally extending raised rib 128 formed therealong. The raised rib 128 and the registration tab 120 are formed on the same side of the fastener 20 for reasons that will be described below. The shank 116 further includes a retaining portion 130 extending from the smooth portion and terminating at the pointed tip 120. The retaining portion 130 preferably comprises a plurality of circumferential one-way retainer elements 132. The preferred fastener is commonly known as a Christmas tree type fastener. The fastener element 20 is preferably formed of ABS polycarbonate.

Referring now to FIG. 3, the installation of the audio speaker mounting assembly 10 of the present invention is shown and will now be described. The speaker 14 is preferably of conventional design and includes a frame 140 supporting a speaker magnet 142 at one end thereof and having a peripheral mounting rim flange 144 extending laterally therefrom. Typically, the speaker 14 will also include an acoustic cone and an acoustic sealing edge 146 extending axially from an end of the frame 162. To begin installation of the audio speaker mounting assembly 10, the speaker 14 is secured to the cover member 12 by positioning the speaker 14 on the exterior surface 26 of the speaker portion 28 with the sealing edge 146 of the speaker 14 bearing against the sealing rib 46 of the cover member 12. Fastener receiving openings (not shown) may be formed in the mounting rim flange 144 of the speaker 14 to register with the central blind holes 52 of the raised cylindrical studs 50. The speaker 14 is secured by inserting appropriate fasteners (not shown) through the mounting rim flange 144 and into the central blind holes 52 of the raised cylindrical studs 50.

Next, the substrate panel 18 is prepared for installation of the audio speaker mounting assembly 10. As shown in FIG.

3, the substrate panel 18 has a primary thickness t1. In the region in which the speaker 14 will be installed, it is preferred that an area of reduced thickness t2 be formed during the molding process of the substrate panel 18. Referring to FIGS. 1 and 2, the substrate panel 18 includes an interior surface 150 and an exterior surface 152. A speaker-accommodating opening 154 is formed in the substrate panel 18, and adjacent connector-accommodating openings 156 are formed at diametrically opposed positions with respect to the speaker opening 154. In the preferred embodiment, the speaker-accommodating opening 154 and connector-accommodating openings 156 are connected with one another as shown and extend between the interior surface 150 and the exterior surface 152. Preferably, the openings 154 and 156 are trimmed into the substrate panel 18 after the panel 18 is molded, because the audio speaker 14 is typically an optional feature. Alternatively, the openings 154 and 156 can be formed by means of appropriate dies employed during the molding process of the substrate panel 18.

The cover member 12 and retainer bracket 16 are connected to one another and to the substrate panel 18 by connecting the cover member 12 and retainer bracket 16 to each other via their respective connecting structures 54 and 100, with the substrate panel 18 sandwiched between the cover member 12 and retainer bracket 16, as shown in FIG. 3. More particularly, the cover member 12 is positioned against the interior surface 150 of the substrate panel 18 with the speaker 14 attached thereto extending into the speaker-accommodating opening 154 and the cover connecting structures 54 extending into the connector-accommodating openings 156. The retainer bracket 16 is then brought into engagement with the cover member 12 from the side of the exterior surface 152 of the substrate panel 18, and the cover member 12 and retainer bracket 16 are connected to each other by engaging the transverse lip 110 of each retainer bracket connecting structure 100 with the shelf 62 of each cover connecting structure 54.

The spacing between the cover-connecting structures 54 and the spacing between the retainer bracket connecting structures 100 is such that, with the respective connecting structures 54, 100 coupled with each other, the risers 102 of the retainer bracket connecting structures 100 will be flexed slightly inwardly so as to bias the transverse lip 110 of each retainer bracket connecting structure 100 into engagement with the shelf 62 of each cover-connecting structure 54. The beveled edge 64 of the transverse shelf 62 of each of the cover-connecting structures 54 and the beveled outer surface 108 of the head 106 of each of the retainer bracket-connecting structures 100 facilitate coupling of the cover member 12 and retainer bracket 16. Specifically, the beveled edge 64 and the beveled outer surface 108 cause each riser 102 to deflect elastically inwardly as the cover member 12 and retainer bracket 16 are brought together, until the head 106 of the retainer bracket-connecting structures 100 is inserted beyond the shelf 62 of the cover-connecting structure 54, so that the head 106 and transverse lip 110 can snap into engagement with the shelf 62. The width of each head 106 of the retainer bracket-connecting structure 100 is slightly smaller than the distance between the opposed side walls 60 of the riser 56 of each cover-connecting structure 54, so that the head 106 is captured within the transverse shelf 62 and so that the side walls 60 prevent the transverse lip 110 from sliding sideways with respect to the shelf 62 to disengage itself therefrom.

The length of the riser 56 of each cover connecting structure 54 and the length of the riser 102 of each retainer bracket-connecting structure 100 is such that, with the cover connecting structure 54 engaged with the retainer bracket-connecting structure 100, the distance between the peripheral edge 36 of the cover member 12 and the interior surface 74 of the retainer bracket 16 is slightly less than the thickness t2 of the portion of the substrate panel 18 adjacent the openings 154 and 156. Thus, the interlocked cover member 12 and retainer bracket 16 will slightly compress the substrate panel 18 to hold the assembly 10 in place with respect to the substrate panel 18.

The thickness t2 of the substrate in the region adjacent the openings 154, 156 is preferably less than the thickness t1 of the remainder of the substrate panel 18 so as to reduce the necessary respective lengths of the riser 56 and the riser 102, thus making the risers 56 and 102 less prone to breakage.

In a preferred mode of operation, the cover member 12, with the speaker 14 attached thereto, is attached to the retainer bracket 16 with the substrate panel 18 sandwiched therebetween in a pre-assembly operation following the formation of the substrate panel 18. The substrate panel 18, with the audio speaker mounting assembly 10 attached thereto, can then be shipped to the vehicle assembly line, whereat the substrate panel 18 and speaker mounting assembly 10 attached thereto can be installed into the interior of the vehicle.

In the pre-assembly step, the fasteners 20 are preferably partially connected to the speaker mounting assembly 10 by inserting each shank 116 through the openings 40 formed in the cover member 12 and into the through-holes 90 of the retainer brackets 16. The inner arcuate riser 114 formed adjacent each through-hole 90 guides the respective shank 116 toward the through-hole 90.

The substrate panel 18 and the speaker mounting assembly 10 are installed into the interior of the vehicle as follows. Fastener receiving holes 160 are pre-drilled at appropriate locations in the sheet metal panel 22 of the interior of the vehicle, and the substrate panel 18 is positioned with respect to the sheet metal panel 22 with the circular portion 42 of the opening 40 of the cover member 12 and the through-holes 90 of the retainer bracket 16 aligned with the pre-drilled holes 160 formed in the sheet metal panel 22. A fastener 20 is inserted into each of the aligned pairs of openings 40, 90 and into the pre-drilled holes 160 formed in the sheet metal panel 22. Alternatively, if the fasteners 20 are partially inserted during a pre-installation assembly step, the pointed tips 120 are aligned with the pre-drilled holes 160 formed in the sheet metal panel 22 and are driven into the panel 22 to secure the substrate panel 18 and the speaker mounting assembly 10 to the panel 22.

The circumferential retainer elements 132 of the retaining portion 130 of the fastener 20 are constructed and arranged in a conventional fashion to permit the fastener shank 116 to be inserted into the sheet metal panel 22, but not be retracted from the sheet metal panel 22. The raised rib 128 formed along the shank 116 of each fastener 22 is received by the rectangular portion 44 of each opening 40, so that, each fastener 22 can only be installed in a single preferred orientation. Moreover, the registration tab 124 is received in the rectangular portion 44 of each opening 40 and is inserted into the riser structure 56 of each cover-connecting structure 54 between the opposed side walls 60, to further ensure proper orientation of the fastener 22 and proper registration of the fastener head 118. Proper registration of the head 118 is important so that the upper surface 122 of the head 118 properly conforms, or aligns flush, with the interior surface 24 of the cover member 12. The head 118 of the fastener 22 is preferably received within each recessed area 38 formed in the interior surface 24 of the cover member 12, so that the top surface 122 of the head 118 will be essentially flush with the interior surface 24.

As shown in FIG. 3, the outer surface of the raised rib 128 also bears against the riser 102 of the retainer bracket connecting structure 100 of the retainer bracket 16 so as to prevent the transverse lip 110 from backing out of engagement with the shelf 62 of the cover connecting structure 54, thereby ensuring continued connection of the cover member 12 to the retainer bracket 16.

Interior vehicle panels, and, in particular, headliner panels, are often arranged with a gap between the substrate panel 18 and the sheet metal 22. In the preferred embodiment of the present invention, the length of the raised studs 88 of the retainer bracket 16 corresponds to this preferred gap so that the gap between the substrate panel 18 and the sheet metal 22 is retained when the fasteners 20 are driven through the speaker mounting assembly 10 and into the sheet metal panel 22. If there is to be no gap between the substrate panel 18 and the sheet metal panel 22, the raised studs 88 may be omitted.

The invention has been described in an illustrative manner, and it is to be understood that the terminology used is intended to be in the nature of words of description rather than of limitation.

Many modifications and variations of the present invention are possible in light of the above the teachings. Therefore, it is to be understood that within the scope of the appended claims, the invention may be practiced other than as specifically described.

What is claimed is:

1. A speaker mounting assembly for mounting an audio speaker to a sheet metal panel and resilient substrate panel of an automotive vehicle, the substrate panel having an exterior surface facing the sheet metal panel and an interior surface facing the interior of the vehicle, said assembly comprising:

a cover member having an interior surface facing the interior of the vehicle and an exterior surface adapted to fixedly receive the audio speaker and disposed against the interior surface of the substrate panel;

a retainer bracket disposed between the substrate panel and the sheet metal panel, said retainer bracket having an interior surface facing said exterior surface of said cover member and an opposite exterior surface;

a first connector integrally molded and projecting outwardly from said exterior surface of said cover member; and a second connector projecting outwardly from said interior surface of said retainer bracket for lockingly engaging with said first connector and operatively interconnect said cover member and said retainer bracket, whereby the substrate panel is sandwiched therebetween.

2. An assembly as set forth in claim 1 wherein said cover member includes at least one opening extending axially between said interior surface and said exterior surface and said retainer bracket including at least one through-hole extending axially between said interior surface and said exterior surface and aligned axially with said opening.

3. An assembly as set forth in claim 2 further including a fastener extending longitudinally between a head and a distal tip axially received through said opening and said through-hole for fixedly securing said assembly to the sheet metal panel.

4. An assembly set forth in claim 3 wherein said first connector includes an upstanding riser structure defined by an outer wall connected between spaced apart and opposing side walls and a planar shelf extending transverse from said outer wall and closing the space between said opposing side walls.

5. An assembly as set forth in claim 4 wherein said second connector includes a riser projecting outwardly from said interior surface of said retainer to a head portion, said head portion having a beveled outer surface extending to a transverse lip.

6. An assembly set forth in claim 5 wherein said riser structure extends axially from said opening and said riser extending axially from said through hole whereby said transverse lip lockingly engages with said planar shelf for interconnecting said cover member and said retainer bracket.

7. An assembly as set forth in claim 6 wherein said retainer bracket further includes an inner arcuate riser projecting outwardly from said interior surface and spaced opposite said riser for guiding said fastener through said through-hole.

8. An assembly as set forth in claim 7 wherein said retainer bracket further includes at least one raised stud encircling said through-hole and projecting outwardly from said exterior surface for spacing said retainer bracket from the sheet metal panel.

9. An assembly as set forth in claim 8 wherein said cover member includes a center speaker portion forming a grill of openings for allowing the speaker to transmit sound through said cover member.

10. An assembly as set forth in claim 9 wherein said cover member includes a locking bezel portion extending from and surrounding said center speaker portion for supporting at least one of said first connectors.

11. An assembly as set forth in claim 10 wherein said retainer bracket includes main portion having a center recessed area projecting away from said cover member for receiving a portion of the speaker therein.

12. An assembly as set forth in claim 11 wherein said fastener includes a retaining portion defined by a plurality of radially projecting retaining elements adjacent said tip for lockingly securing said fastener and said assembly to the sheet metal panel.

13. An assembly as set forth in claim 12 wherein said fastener includes a raised rib extending longitudinally from said head to said retaining portion for engaging said riser of said second connector and maintain locking engagement of said transverse lip with said shelf of said first connector.

14. An assembly as set forth in claim 13 wherein said opening in said cover member includes a circular portion and a transversely extending rectangular portion, said fastener further including a registration tab projecting from said head for aligning with said rectangular portion and thereby position said raised rib for mating engagement with said riser.

* * * * *

UNITED STATES PATENT AND TRADEMARK OFFICE
CERTIFICATE OF CORRECTION

PATENT NO. : 6,456,722 B1
DATED : September 24, 2002
INVENTOR(S) : Davey et al.

It is certified that error appears in the above-identified patent and that said Letters Patent is hereby corrected as shown below:

Column 1,
Line 47, delete "forgoing" and insert -- foregoing -- therefor;
Line 58, delete "coder" and insert -- cover -- therefor;

Column 2,
Line 22, delete "a" and insert -- an -- therefor;
Line 22, delete "is";
Line 26, delete "ad" and insert -- and -- therefor;

Column 3,
Line 56, delete "he" and insert -- the -- therefor;

Column 8,
Lines 6 and 16, insert -- as -- between "assembly" and "set";
Line 41, insert -- a -- between "includes" and "main"; and
Line 52, delete "maintain" and insert -- maintaining -- therefor.

Signed and Sealed this

Eleventh Day of February, 2003

JAMES E. ROGAN
*Director of the United States Patent and Trademark Office*